(12) United States Patent
Boemler

(10) Patent No.: US 7,476,836 B2
(45) Date of Patent: *Jan. 13, 2009

(54) MULTI-POINT CORRELATED SAMPLING FOR IMAGE SENSORS

(75) Inventor: Christian Boemler, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 11/898,433

(22) Filed: Sep. 12, 2007

(65) Prior Publication Data

US 2008/0006764 A1    Jan. 10, 2008

Related U.S. Application Data

(63) Continuation of application No. 11/105,409, filed on Apr. 14, 2005, now Pat. No. 7,282,685.

(51) Int. Cl.
*H01L 27/00* (2006.01)
*H04N 5/335* (2006.01)

(52) U.S. Cl. .................. 250/208.1; 348/241; 348/308

(58) Field of Classification Search .......... 250/208.1; 348/241, 243, 308, 309
See application file for complete search history.

(56) References Cited

U.S. PATENT DOCUMENTS

| | | | |
|---|---|---|---|
| 5,751,189 A | 5/1998 | Shyu et al. | |
| 5,892,540 A | 4/1999 | Kozlowski et al. | |
| 6,421,085 B1 | 7/2002 | Xu | |
| 6,486,504 B1 | 11/2002 | Guidash | |
| 6,512,546 B1 | 1/2003 | Decker et al. | |
| 6,791,612 B1 | 9/2004 | Hwang | |
| 6,982,183 B2 | 1/2006 | Zhao | |
| 7,133,074 B1 | 11/2006 | Brehmer et al. | |
| 7,282,685 B2 * | 10/2007 | Boemler ............... | 250/208.1 |
| 2002/0154231 A1 | 10/2002 | Decker et al. | |
| 2003/0020100 A1 | 1/2003 | Guidash | |
| 2005/0206752 A1 | 9/2005 | Lim | |

FOREIGN PATENT DOCUMENTS

DE    42 03 413 A1    8/1993
EP    0 813 338 A2    12/1997

OTHER PUBLICATIONS

Wey, H. et al., "Correlated Triple Sampling: A Digital Low-Noise Readout-Method for CCD's", Proceedings of the Mediterranean Electrotechnical Conference. (MELECON), Madrid, Oct. 8-10, 1985, Digital Signal Processing, New York, IEEE, US, vol. 2, Oct. 8, 1985, pp. 209-212.

* cited by examiner

*Primary Examiner*—John R Lee
(74) *Attorney, Agent, or Firm*—Dickstein Shapiro LLP

(57) ABSTRACT

An improved passive pixel sensor (PPS) circuit comprising a correlated sampling circuit and method that integrates pixel charge leakage onto an integrating amplifier during sampling periods. An integrator circuit is provided for integrating PPS pixel charges received via a column line, and correlated sampling circuit is provided for the removal of kTC noise and dark integration. A multi-point sampling of the output of the integrator is provided wherein at least a first and second correlated sample are used to detect the charge integration from the column line leakages, and at least a third sample is used to detect the PPS signal after pixel readout. The correlated sampling method is employed to remove kTC noise and dark integration from the PPS signal.

23 Claims, 9 Drawing Sheets

MULTI-POINT CORRELATED SAMPLING FOR IMAGE SENSORS

The present application is a continuation of application Ser. No. 11,105/409, filed Apr. 14, 2005, now U.S. Pat. No. 7,282,685 (Issued Jun. 8, 2007) the entire disclosure of which is incorporated herein by reference.

FIELD OF THE INVENTION

The present invention relates generally to passive pixel sensor image devices and to correlated sampling methods for the same.

BACKGROUND OF THE INVENTION

Image sensors typically employ light detecting elements (e.g., photosensors) and are used in various applications. Such image sensors may be formed using a variety of fabrication techniques. Currently, two commonly fabricated image sensors are CMOS image sensors and charge coupled device (CCD) image sensors. Each sensor generally includes an array of pixels containing the photosensors. The image sensors typically use photosensors in the form of photogates, phototransistors or photodiodes.

When an image is focused on the image sensor array (also called an "imager array" or "pixel array"), light corresponding to the image is directed to the pixels usually through micro-lenses. Each micro-lens may be used to direct incoming light through a circuitry region of the corresponding pixel to the photosensor region, thereby increasing the amount of light reaching the photosensor. It is known in the art to use circuitry that includes storage regions that collect pixel charge representing the light reaching the photosensors.

In a CMOS imager, the pixels of the array convert pixel charge to an analog voltage signal that is proportional to the light collected by the photosensor. It is known in the art to use row select transistors to select a particular row in the pixel array and cause the storage element (e.g., a floating diffusion region) for each pixel in the selected row to provide an output voltage on a column line representing collected charge for further processing by image sensor circuitry. Thus, the pixel array circuitry samples the pixel output voltage in each column of the pixel array one row (i.e., the selected row) at a time. The analog voltage signals are converted to digital signals which may be used to replicate an image represented by the light incident on the photosensors of the array (i.e., the incident light). For example, the digitized pixel array voltage signals may be used to store or display a corresponding image on a monitor or to otherwise provide information about the image.

It is known to use passive pixel sensors ("PPS") having one amplifier per column of pixels in image sensors. In PPS image sensors, each pixel contains just one transistor that is used as a charge gate for switching the contents of the pixel to the charge amplifiers.

It is also known to use active pixel sensors ("APS") in image sensors. In APS, each pixel has an amplifier. APS commonly have four transistors (4T), but other configurations (for example, 3T and 5T) are also known.

Although PPS pre-dates the use of APS in CMOS image sensors, it was not until the advent of APS that CMOS image sensors greatly increased in commercial use. This occurred in part because historically, PPS had gained a negative reputation as being inferior with respect to fixed pattern noise ("FPN") and noise due to reduced readout sensitivity and column line leakage. As a result, charge-coupled devices ("CCDs") were favored over CMOS image sensors having PPS, notwithstanding that the manufacturing process for CCDs was much more costly than that for CMOS devices.

With the advent of APS, however, it became possible to read the floating diffusion region of a pixel through an amplifier and a row select transistor. Unlike PPS, which have an amplifier per column, APS have an amplifier per pixel and can compensate for noise on a pixel-by-pixel basis. APS have increased readout sensitivity as compared to traditional PPS image sensor circuits.

APS also have improved performance relative to traditional PPS circuits due to reduced column line leakage. In PPS, when a pixel leaks (which occurs, for example, upon pixel blooming), the pixel charge runs straight through the transistor gate and onto the column line. Unlike PPS, the multi-transistor configuration of APS enables the pixel signal to be buffered thereby reducing column line leakage.

APS are the most common form of CMOS image sensors today. However, despite benefits such as increased readout sensitivity and reduced column line leakage over traditional PPS circuits, APS require substantially more circuitry surrounding the pixel area, and provide substantially reduced fill factor relative to PPS. For example, it is not uncommon for APS circuits to devote seventy percent of the pixel array area to amplifier and other associated circuitry. This is undesirable.

It is known to use integrator amplifiers to improve readout sensitivity in PPS circuits. An integrator maintains constant column line voltage and integrates charge dumped from the pixel onto a feedback (e.g., integrating) capacitor. The feedback capacitance must be low in order to achieve high conversion gain. Low feedback capacitance, however, results in kTC noise. This is undesirable.

It is also known to use two-point correlated double sampling ("CDS") to remove kTC noise in a PPS imager circuit. For example, two-point CDS samples the pixel signal outputs (via a column integrator circuit) and is used to remove noise due to column line leakage that occurs between the time the first sample point is taken and the second sample point is taken. Column line leakage may arise from a number of sources. Such leakage (e.g., "dark integration") is primarily due to charge leakage in a row being read out, but may also arise from blooming in rows other than the readout row. Photon-generated electrons (e.g., as a result of pixel blooming) that are picked up by the column line instead of the pixel result in leakage current on the column line. The amount of column line leakage can vary from column to column, and can add a dark signal to all the pixels in a given column. Moreover, the parasitic capacitance can be substantial and the amplifier will have difficulty driving this capacitance within a reasonable settling time. As a result, the time required between reset and signal sampling has to be longer than if a shorter settling time were achieved. This in turn provides more time for additional column line leakage in the form of dark integration. Although two-point CDS may be used to remove kTC noise from a PPS circuit comprising an integrator, there remains substantial, undesirable dark integration, particularly dark current occurring after the time of the first sample point in the two-point sampling.

There remains a need for an improved image sensor having pixels and associated circuitry of reduced size with increased pixel fill factor. There also is a need for an improved PPS circuit with increased readout sensitivity. There also is a need for an improved PPS circuit with reduced column line leakage. Further, there is a need for a PPS circuit with improved correlated sampling for the removal of kTC noise and dark integration.

BRIEF SUMMARY OF THE INVENTION

The present invention provides in various method and apparatus exemplary embodiments an improved PPS circuit and method of operating it that integrates leakage onto an integrator amplifier during sampling periods. The method and apparatus of the present invention provides improved correlated sampling for the reduction of kTC and dark integration noise, such as bus leakage and blooming from pixel rows.

The above and other features and advantages are achieved in various method and apparatus exemplary embodiments of the invention by providing a correlated sampling circuit for sampling and holding multiple signals corresponding to pixel signals received via an integrator circuit. PPS sensor circuits comprising integrators and correlated sampling circuitry are used in the present invention to enable simpler circuitry of reduced size and improved performance.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

In the following detailed description, reference is made to the accompanying drawings which form a part hereof, and which illustrate specific embodiments of the present invention. These embodiments are described in sufficient detail to enable those of ordinary skill in the art to make and use the invention. It is also understood that structural, logical, or procedural changes may be made to the specific embodiments disclosed without departing from the spirit and scope of the present invention. The following detailed description is not to be taken in a limiting sense, and the scope of the present invention is defined only by the appended claims.

Figure 1:
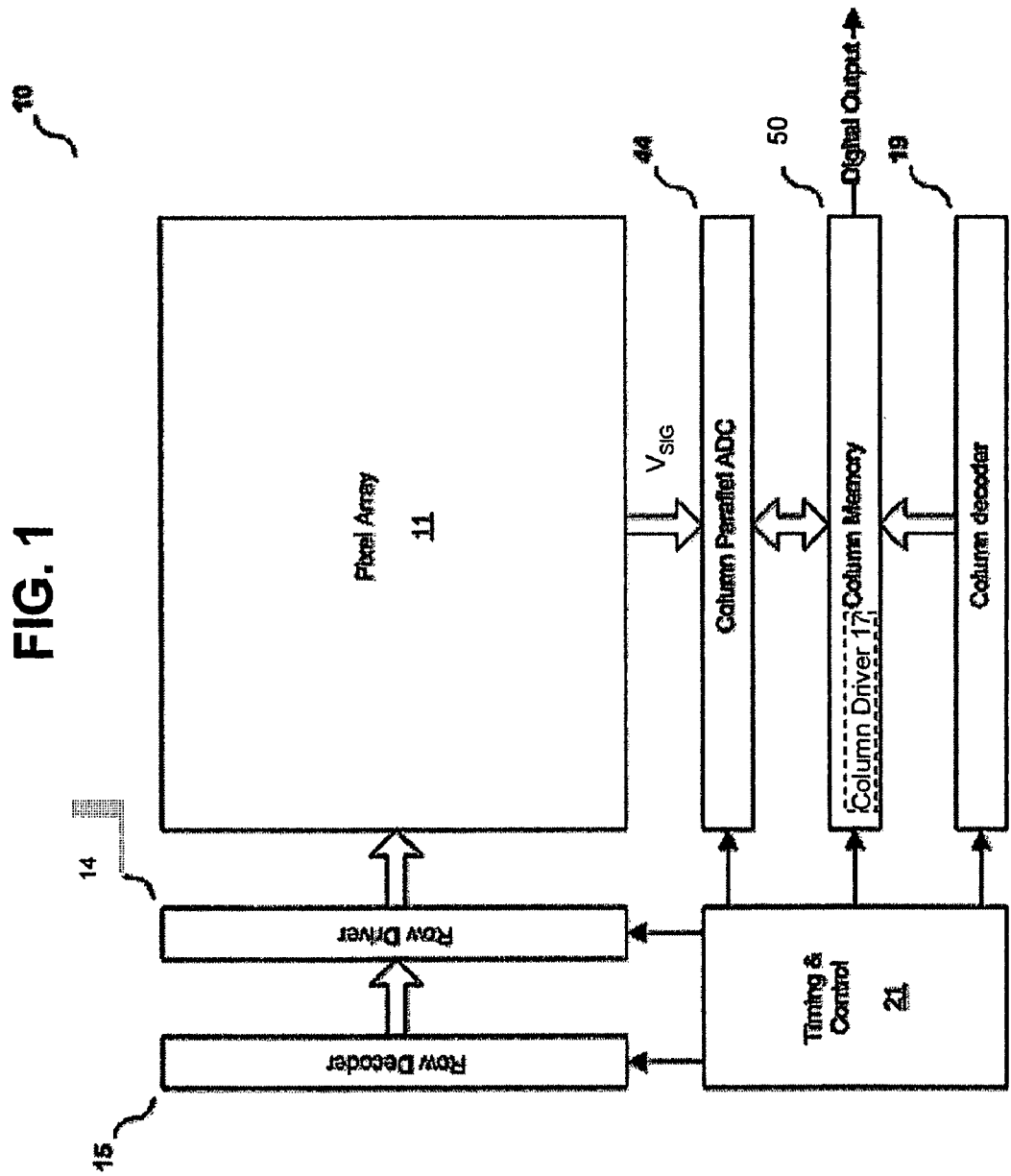
FIG. 1 is a block diagram of a column parallel image sensor.

FIG. 1 illustrates a block diagram for a CMOS imager 10. The imager 10 includes a pixel array 11. The pixel array 11 comprises a plurality of pixels arranged in a predetermined number of columns and rows. The pixels of given rows in array 11 are all turned on at the same time by row select lines and the pixels of a given column are selectively output by a column select line. A plurality of row and column lines (not shown) are provided for the entire array 11. The row lines are selectively activated by the row driver 14 in response to row address decoder 15 and the column select lines are selectively activated by the column driver 17 in response to column address decoder 19. As shown in FIG. 1, the column driver 17 may, for example, be part of a column memory 50 structure. Through the use of address decoders 15, 19, a row and column address is provided for each pixel. The CMOS imager 10 is operated by timing and control circuit 21, which controls address decoders 15, 19 for selecting the appropriate row and column lines for pixel readout, and row and column driver circuitry 14, 17, which apply driving voltage to the drive transistors of the selected row and column lines. The pixel array 11 outputs a signal, $V_{SIG}$, as an analog signal that may be used for further processing by imager 10. Typically, $V_{SIG}$ is digitized by an analog-to-digital converter (ADC) 44. For example, a column parallel ADC may be used to convert analog signals received from a given pixel in a corresponding column to a digital value which may be stored in memory 50. Alternatively, ADC architectures other than column parallel ADC may be used for digitizing the analog signals, such as column serial architectures (e.g., one ADC for all columns).

In CMOS imager systems comprising APS pixels, two signals typically are taken, a reset signal $V_{RST}$ (taken right after the floating diffusion region is reset), and pixel charge signal $V_{SIG}$ (taken after the signal corresponding to the charge collected on the photodiode is transferred to the floating diffusion region). As explained in greater detail below, these two signals $V_{RST}$, $V_{SIG}$, are used in conventional correlated double sampling methods to remove kTC noise, but fail to reduce other signal noise such as noise due to dark integration. The present invention provides a structure and method for sampling at least three signals for improved removal of signal noise, including reduction of dark current. The present invention not only improves the performance of PPS pixels, but is also applicable to APS pixel structures where signal noise (e.g., dark integration) collected on the floating diffusion region increases at substantially a constant rate.

Figure 2A:
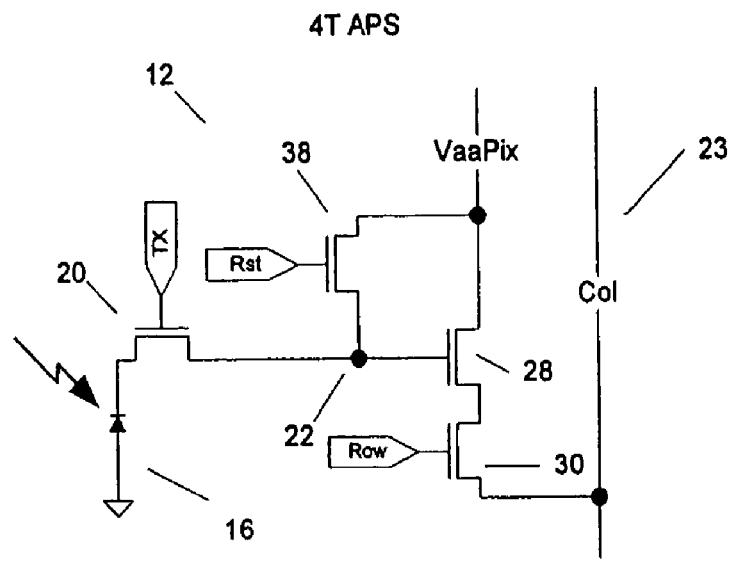
FIG. 2A is a schematic of an APS pixel cell in an image sensor that generates analog signals.

FIG. 2A shows a four transistor (4T) APS pixel cell 12 used in an imager such as the CMOS imager 10 illustrated in FIG. 1. The APS pixel cell 12 includes a photosensor 16, floating diffusion region 22, transfer transistor 20, reset transistor 38, source follower transistor 28 and row select transistor 30. The photosensor 16 is shown as a photodiode, but other forms of photosensors may be used (for example a photogate, etc.). The photosensor 16 is connected to the floating diffusion region 22 by the transfer transistor 20 when the transfer transistor 20 is activated by a control signal TX. The reset transistor 38 is connected between the floating diffusion region 22 and an array pixel supply voltage $V_{AA\text{-}Pix}$. A reset control signal RST is used to activate the reset transistor 38, which resets the floating diffusion region 22 to a reset voltage $V_{RST}$ as is known in the art. The source follower transistor 28 has its gate connected to the floating diffusion region 22 and is connected between pixel supply voltage $V_{AA\text{-}Pix}$ and the row select transistor 30. The source follower transistor 28 converts the charge stored at the floating diffusion region 22 into an electrical output voltage signal. The row select transistor 30 is controllable by a row select signal row for selectively connecting the source follower transistor 28 and its output voltage signal to a column line 23 of a pixel array. When the FIG. 2A pixel circuit is used in the FIG. 1 system, each pixel outputs a reset voltage $V_{RST}$ taken after reset of the floating diffusion region 22 and a pixel output voltage $V_{SIG}$ taken after photogenerated charges are transferred to the floating diffusion region by transfer transistors 20. These signals are subtracted $V_{RST}$-$V_{SIG}$ by ADC 44 for conventional correlated double sampling, and digitized and represent the pixel image signal which is collected with pixel image signals from other array pixels.

Figure 2B:
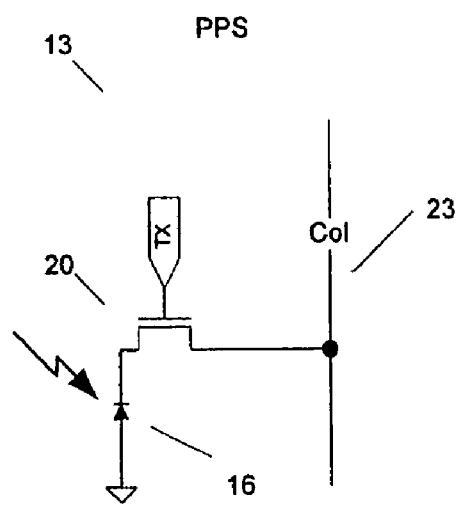
FIG. 2B is a schematic of a PPS pixel cell in an image sensor that generates analog signals.

FIG. 2B shows a PPS pixel cell 13 used in an imager such as the CMOS imager 10 illustrated in FIG. 1. The PPS pixel cell 13 includes a photosensor 16 and transfer transistor 20. As in the case of APS pixel cell 12 (FIG. 2A), the illustrated PPS pixel cell 13 uses a photodiode, but other forms of photosensors may be used. When transfer transistor 20 is activated by a control signal TX, photosensor 16 is connected to (and reads collected charge to) column line 23. PPS have many benefits, including for example the following. PPS are configured as a simple circuit (e.g., a single transistor circuit) and the pixel sizes can be very small with large photosensitive areas (e.g., because there is less circuitry that needs to be accommodated). The metal wiring through the PPS pixel array is limited to one horizontal wire for the transistor and one vertical wire for the column signal. The signal lag for PPS circuits is minimal because the column line is kept permanently at high voltage. Maintaining the column line at a permanently high voltage has other benefits, including, for example, that when using a pinned photodiode, the photodiode can be automatically reset while being read because the capacitance on the column line and the amplifier feedback loop may be employed to keep the column line at a constant voltage that does not drop below the pin voltage. Not dropping the column line voltage below the pin voltage prevents residual charge from remaining on the photodiode. (Compare for example a 4T APS for which charge remains on the photodiode when the floating diffusion voltage drops lower than the pin voltage and for which the pixel must be reset in order to remove this remaining charge.) Additionally, when using pinned photodiodes in a PPS circuit, resetting does not add kTC noise because the pin voltage establishes the reset voltage level, and blooming is drained through the transistor gate onto the column line. PPS circuits also have low pixel dark current because there is no contact on the photodiode. Vertical binning (i.e., accumulation of the readout from multiple columns) in PPS circuits is as simple as pulsing two or more transfer transistors 20 high at the same time.

Unlike APS pixel performance, PPS pixel performance is determined by column circuitry, and does not degrades as much as APS when pixel size is reduced. This attribute is advantageous in many commercial markets. For example markets such as the handheld and cell phone markets produce products that must meet small size constraints, and are trending toward products having smaller pixels even at substantially increased cost. PPS pixels would be an advantageous choice for these, and many other, markets.

Figure 3:
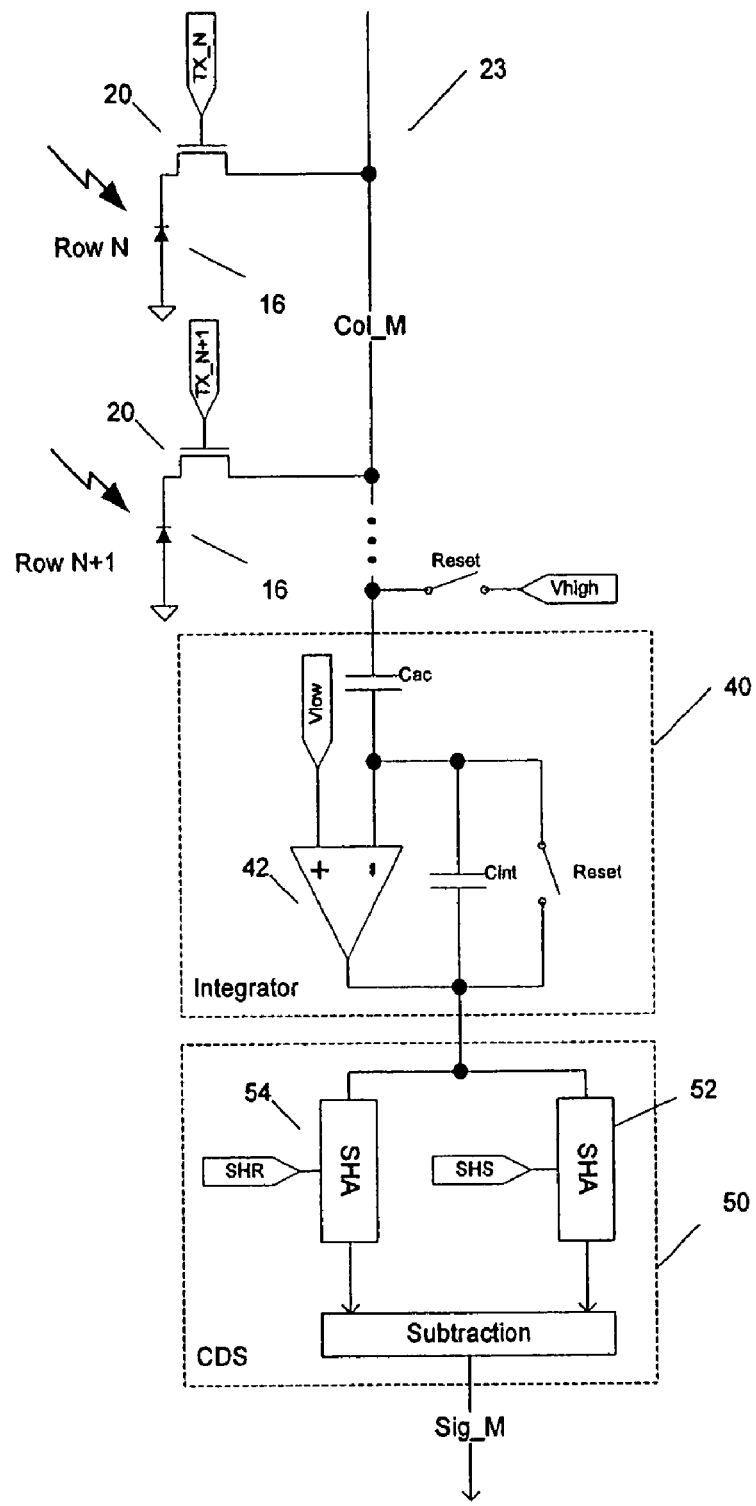
FIG. 3 is a schematic of a column of PPS pixel sensors from an array of pixels that outputs signals to an integrator and two-point CDS circuitry.

One of the problems with traditional PPS sensor circuits is their lack of readout sensitivity. It is known to use PPS circuits that comprise integrator amplifiers to improve readout sensitivity. FIG. 3 illustrates a known PPS CMOS circuit. For simplicity, FIG. 3 illustrates a single column from pixel array 11 (FIG. 1), and illustrates two PPS pixel sensors 13 of the column out of many in the array. PPS pixel sensors 13 are shown for rows N and N+1, respectively having corresponding transfer signals TX_N, TX_N+1 to control respective transfer gates 20. As illustrated in FIG. 3, the circuit comprises PPS pixel sensor 13, integrator circuit 41, and CDS circuit 50 for performing 2-point CDS. The imager of FIG. 1 may be modified, for example to include integrator circuit 41 and CDS circuit 50 of FIG. 3 between a column-line output of pixel array 11 (FIG. 1) and the input of ADC 44 (FIG. 1).

Integrator circuit 41 comprises a feedback capacitor (i.e., charge integration capacitor) $C_{INT}$, and amplifier 42. Integrator circuit 41 maintains constant voltage on column line 23 and integrates charge received from pixel 13 via column line 23 onto the feedback capacitor $C_{INT}$, which results in a voltage increase at the output of integrator circuit 41. However, the feedback capacitance must be low in order to achieve high conversion gain. Low feedback capacitance results in kTC noise. Thus, integrator circuit 41 improves readout sensitivity, but adds kTC noise due to the low feedback capacitance on capacitor $C_{INT}$. In FIG. 3, capacitor $C_{ac}$ performs an AC coupling function for maintaining constant voltage on column line 23.

Figure 4:
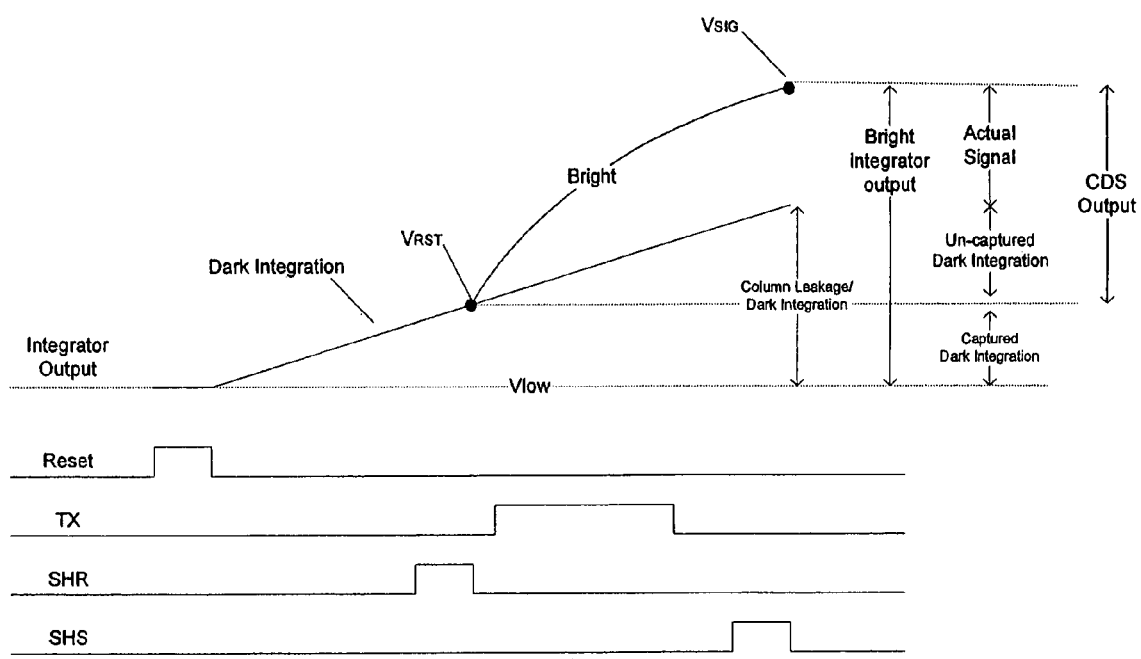
FIG. 4 is a diagram of signal sampling values and sampling timing for a conventional two-point CDS sampling method for the FIG. 3 circuit.

As shown in FIG. 4, and with further reference to FIG. 3, a two-point CDS circuit 50 is conventionally used to remove the kTC noise. After the charge stored on a given row of PPS pixel sensors 13 is read out and integrated onto integrator circuit 41, capacitor $C_{INT}$ must be reset in order to integrate the next series of incoming charge. As shown in the timing diagram portion of FIG. 4, a reset signal, RESET, is the first of a series of pulse signals and is employed to reset integrator circuit 41 to receive charge collected by pixels 13. In the FIG. 3 embodiment, reset occurs upon applying the RESET signal (with switches RESET in the closed position).

After resetting PPS pixel sensors 13, column line 23 is kept at $V_{high}$, and charge on column line 23 is integrated into the feedback capacitance of integrator circuit 41 and stored on feedback capacitor $C_{INT}$. The integrated charge appears at the output of integrator circuit 41 as an increase in voltage. Integrator circuit 41 may be used to increase conversion gain because the corresponding gain is proportional to $1/C_{INT}$. Thus, to achieve high conversion gain, the feedback capacitance $C_{INT}$ needs to be as low as possible, thus kTC noise will be added during reset and included in the integrator output.

FIG. 4 shows that after the RESET pulse is applied, a reset sample pulse SHR is applied. Signal pulse SHR causes a reset signal, $V_{RST}$, to be sampled and held by CDS circuit 50. In the embodiment of FIG. 3, SHR is applied to sample and hold circuit 54 which samples and holds $V_{RST}$. The sampling and holding of $V_{RST}$ is the first sample point of the two-point CDS sampling.

As further shown in FIG. 4, SHR is applied shortly before a transfer signal pulse, TX. TX is employed to drive transfer gates 20 for readout of pixels 13 (FIG. 3). By applying pulse SHR just before pulse TX (FIG. 4) the first sample point $V_{RST}$ occurs shortly before the pixels are read out. In this way, the first sample point, $V_{RST}$, is taken near the end of reset and before the beginning of pixel readout.

In the FIG. 3 circuit, TX is applied to transfer gate 20 of pixels 13 to cause collected charge to be read out on a given row of pixels (e.g., TX_N is applied to the transfer gates of pixels in row N causing charge collected at a photosensor 16 in this row to be transferred to column line 23). Charge appearing on the column line will be integrated onto the feedback capacitor $C_{INT}$ of integrator circuit 41 which is employed to increase the voltage at the output of integrator circuit 41 by an amount corresponding to the charge collected and read out from PPS sensor pixel 13.

The output of integrator circuit 41 $V_{SIG}$ thus corresponds to the pixel signal level. Again, for simplicity, FIG. 3 shows only two of a series PPS pixel sensors 13 for column line 23, and only shows one (Col_M) of a series of columns in a pixel array. $V_{SIG}$ is sampled and held by sample and hold circuit 52 upon application of pulse SHS (FIG. 3). This is the second sample point of the two-point CDS sampling.

As illustrated in FIG. 3, CDS circuit 50 determines the differential voltage between the pixel signal level $V_{SIG}$ that is held on sample and hold circuit 52 and the previously sampled reset level $V_{RST}$ that is held on sample and hold circuit 54 (e.g., CDS 50 subtracts $V_{RST}$ from $V_{SIG}$). Because $V_{RST}$ and $V_{SIG}$ include the kTC noise, the 2-point CDS method removes this noise from the pixel signal level ($V_{SIG}$) when the difference between $V_{SIG}$ and the reset signal level ($V_{RST}$) is determined.

When the FIG. 3 circuit is employed in the system of FIG. 1, a reset signal is applied to the column line (and thus a reset voltage $V_{RST}$), and pixel output voltage $V_{SIG}$ is produced for each pixel. For conventional correlated double sampling, these signals are subtracted $V_{RST}-V_{SIG}$ to produce a signal (e.g., Sig_M) which is digitized by ADC 44 and represents a pixel image signal.

Although kTC noise is removed by the two-point CDS circuit 50, dark integration may occur on integrator circuit 41 and may be included as noise in the output of integrator circuit 41. Dark integration may, for example, result from electrons from leakage currents in the diffusions that are permanently connected to a given column line 23, or from pixels in other columns blooming into column line 23. The leakage current can be substantial due to the large number of rows of PPS pixel sensors 13 connected to column line 23. However, because column line 23 is held at virtual $V_{high}$ by the integrator circuit 41 feedback loop (e.g., by ac coupling function of capacitor, $C_{ac}$) and by the column line capacitance, the foregoing leakages can be considered constant assuming the image doesn't change significantly during column signal sampling.

The FIG. 4 timing diagram shows the presence of dark integration in two-point CDS results. In FIG. 4, $V_{RST}$ is sampled (in response to control signal SHR) after reset has begun (i.e., after RESET has been applied) and before pixel readout (i.e., shortly before pulse TX goes high). As also shown in FIG. 4, although two-point CDS captures dark integration occurring between RESET and the sampling of $V_{RST}$ (i.e., captured dark integration), the dark integration occurring between the sampling of $V_{RST}$ and the sampling of $V_{SIG}$ remains un-captured (i.e., residual dark integration). Thus, the differential between $V_{RST}$ and $V_{SIG}$ calculated by traditional CDS circuits and methods removes dark current accumulated prior to sampling $V_{RST}$, but does not remove dark current occurring between $V_{RST}$ and $V_{SIG}$.

Because dark integration can vary column-by-column and, column parasitic capacitance can be substantial, the settling time required by the column amplifier (not shown) for driving this parasitic capacitance may have to be increased. Increased settling time results in a longer time between reset and pixel signal sample. As previously mentioned, the column line leakages (i.e., the dark integration) can be considered constant, thus increased settling time allows additional time during which the total column line leakage increases.

Figure 5:
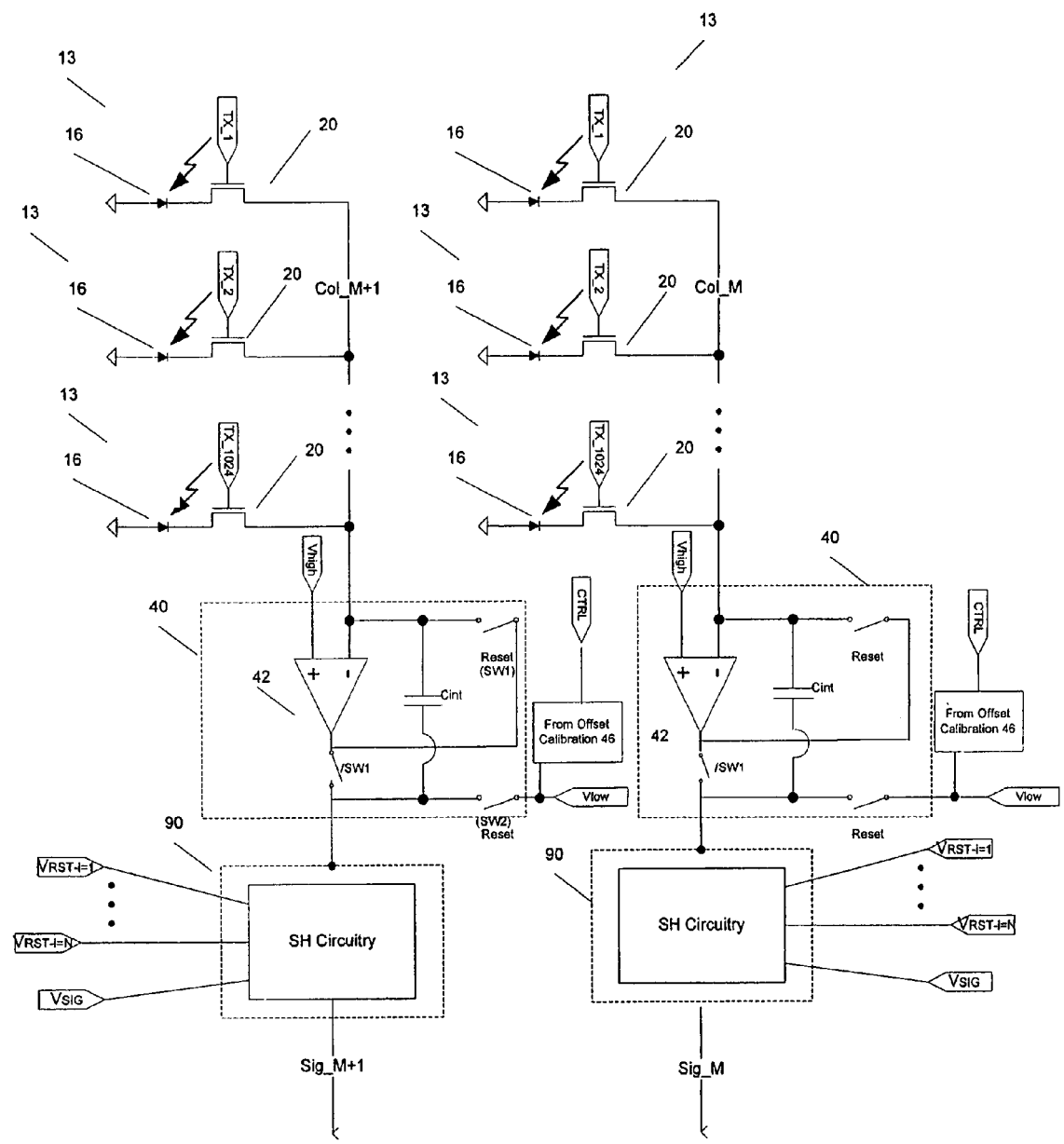
FIG. 5 is a diagram of an embodiment of the invention in which two columns of PPS pixel sensors, from an array of pixels, each output signals to an integrator and multi-point correlated sampling circuitry having at least three sample points.

FIG. 5 illustrates an exemplary embodiment of the invention implemented for two columns of a PPS array circuit 60 having a large number of pixel rows and columns and employing multi-point correlated sampling. As illustrated in FIG. 5, PPS array circuit 60 comprises multiple columns each having PPS pixel cells 13, a column line 23, integrator circuit 40 and correlated sampling circuit 90. It should also be appreciated that the FIG. 5 embodiment shows a representative number of PPS pixel cells 1, 2, . . . 1024 per column, but a pixel array may have any number of PPS pixel cells arranged in rows and columns.

In the embodiment of FIG. 5, correlated sampling circuit 90, at sample and hold circuitry SH, samples multiple reset level voltages $V_{RST-1}$, through $V_{RST-N}$ (where $N \geq 2$). The variable N corresponds to the number of times the reset voltage is sampled (i.e., the number of samplings $V_{RST-1}$, through $V_{RST-N}$). Each sampled and held value (e.g., $V_{RST-i-1}$, $V_{RST-i-2}$ . . . $V_{RST-i-N}$, and $V_{SIG}$) corresponds to an output received from integrator circuit 40, and is held on sample and hold circuitry SH of correlated sampling circuit 90. Sample and hold circuitry SH may be implemented in various ways. For example SH may comprise a separate sample and hold circuit for each sampled signal, or may comprise a single sample and hold circuit that is used to process each sampled signal. In the exemplary embodiment of FIG. 5, correlated sampling circuit 90 produces a correlated sampling output based on the differential between the first two sampled reset values and the differential between the last sampled reset value and $V_{SIG}$.

Preferably, as shown in FIG. 5, an offset calibration circuit 46 is used to store the offset value of integrating amplifier 42, and to apply this offset value to capacitor $C_{INT}$ in response to a control signal CTRL. Signal values received by capacitor $C_{INT}$ from column line 23 are then reduced by the offset value stored on $C_{INT}$, thereby effectively removing an offset error that is inherently applied by amplifier 42 and that would otherwise appear in the output of integrator 40. Integrator 40 does not require an AC-coupling capacitor, but preferably has either tri-state or power down capability. One skilled in the art would recognize that alternative integrator embodiments can be used; for example integrator 41 (previously described with respect to FIG. 3) can be used in the FIG. 5 embodiment in place of integrator 40.

Correlated sampling circuit 90 produces an out according to:

$$V_{RST-i-1}-V_{RST-i-2}-V_{RST-i-N}+V_{SIG}=(V_{RST-1}-V_{RST-2})+(V_{SIG}-V_{RST-N}) \quad (1)$$

For N=2, i=2 is also i=N, and equation (1) becomes:

$$V_{RST-i-1}-V_{RST-i-2}-V_{RST-i-2}+V_{SIG}=V_{RST-1}-(2*V_{RST-i-N-2})+V_{SIG} \quad (2)$$

Thus because, for N=2, there are only two samples of the reset signal, the last reset sample must be used twice (e.g., subtracted twice or subtracted after multiplying by two). When implementing equation (2) in hardware it may be practical to employ a 2× gain in order to achieve ($2*V_{RST-i-N-2}$) (i.e., to use the same signal value twice).

Figure 6:
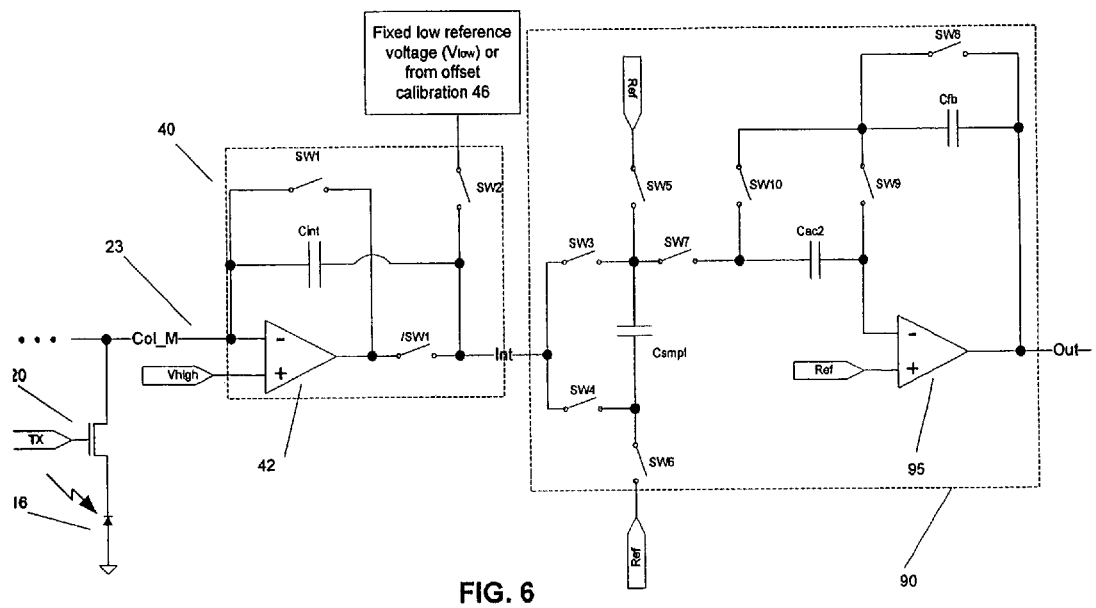
FIG. 6 is a schematic of one column of the FIG. 5 embodiment of the invention employing four-point correlated sampling circuitry in the form of a switched capacitor network.

FIG. 6 shows PPS circuit of FIG. 5 having one specific example of circuitry which may be used for correlated sampling circuit 90 of FIG. 5 for $N \geq 3$. For simplicity, FIG. 6 only shows one pixel column (among many columns) of the PPS array circuit 60 having a switched capacitor circuit network for calculating correlated sampling values according to equation (1). As shown in FIG. 6, and explained below, the correlated sampling circuit 90 comprises sampling capacitor $C_{ampl}$, AC-coupling capacitor $C_{ac2}$, and feedback capacitor $C_{fb}$, as well as amplifier 95.

In the embodiment of FIG. 6, pixel signals are integrated onto integrator 40, and output to correlated sampling circuit 90. The output signal either is applied to the top plate of capacitor $C_{smpl}$, and a reference voltage is applied to the bottom of capacitor $C_{smpl}$, or vice versa, to produce the desired differential (positive or negative) across $C_{smpl}$. As explained in further detail below, the resulting differential voltage (i.e., the differential across $C_{smpl}$) is applied to feedback capacitor $C_{fb}$, which causes a corresponding change in the output of amplifier 95.

Figure 7:
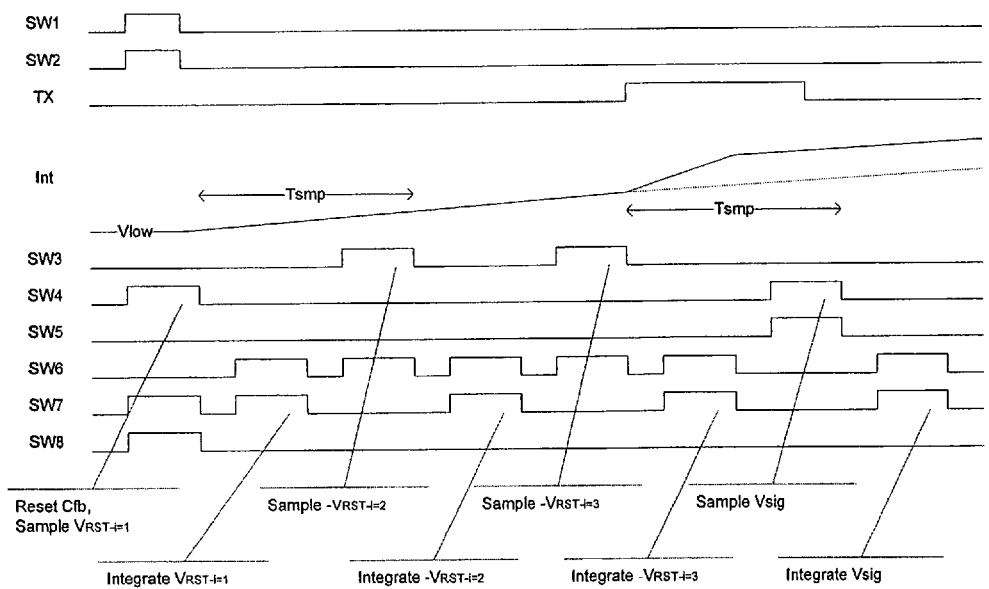
FIG. 7 is a diagram of signal sampling values and signal timing for a multi-point correlated sampling method employed in the embodiment of FIG. 5 (for taking four samples) and the specific circuit embodiment of FIG. 6.

FIG. 7 illustrates the operation of the PPS circuit of FIG. 5 in the form of the specific example circuit of FIG. 6 for calculating equation (1) for N=3. The multi-point correlated sampling of FIGS. 5, 6 removes the dark current captured by the two-point CDS method previously described with reference to FIGS. 3, 4, as well as previously uncaptured dark current occurring between reset, $V_{RST}$, (e.g., the traditional reset sample point shown in FIG. 4) and $V_{SIG}$ (the pixel signal sample point).

The integrator circuit of FIG. 5 is reset and generates a reset signal. This reset signal includes dark current. The reset signal is sampled and held two or more times, with each sample spaced by time $T_{SMP}$ and corresponding to sample reset points $V_{RST-1}$ through $V_{RST-i-N}$. Because the reset signal includes the dark current (which accumulates at a constant rate), the dark current in the differential of $V_{RST-i-1}$ and $V_{RST-i-2}$ corresponds to the dark current in subsequent sample points spaced by the same time (e.g., $T_{SMP}$). Alternatively, the dark current over sample time $T_{SMP}$ can be used to determine the dark current over different, corresponding subsequent sampling times (e.g., $2*T_{SMP}$, $\frac{1}{2}T_{SMP}$, etc.), and equation (1) modified accordingly.

For example, if a first sample time between a first sampled reset value (e.g., $V_{RSTi-1}$) and a later sample reset value (e.g., $V_{RST-i-2}$) is $T_{SMP}$, and if a second sample time between $V_{SIG}$ and a prior reset sample point (e.g., $V_{RST-i-Z}$) is $\frac{1}{2}T_{SMP}$, the slope (i.e., the rate of increase in dark current) is still at least substantially the same between each of the relevant sample pairings (e.g., ($\Delta y/\Delta x=m$ (i.e., the rate of increase in dark current)) for both the sample spread by $T_{SMP}$ and the sample spread by $\frac{1}{2}T_{SMP}$. Thus, where the sample time is halved (e.g., $\Delta x$ is halved), the increase in dark current (the difference between the sampled signals, $\Delta y$) is also halved, and dark current can be removed from the pixel signal based on the dark current measurement obtained from the first two reset samples by modifying equation (1) to:

$$\frac{1}{2}(V_{RST-1}-V_{RST-2})+(V_{SIG}-V_{RST-N}) \quad (3)$$

After sampling and holding reset values, pixels 13 are coupled to column line 23 which causes a pixel signal to be integrated onto amplifier 42 of integrator circuit 40. The integrated pixel signal corresponds to charge collected by pixel 13, but also includes dark current. The integrated pixel signal is sampled and held as $V_{SIG}$. $V_{SIG}$ is sampled at time $T_{SMP}$ after the aforementioned sampling of $V_{RST-i-N}$. Thus, the dark current occurring between $V_{RST-1}$ and $V_{RST-2}$ corresponds to the dark current occurring between each successive sampling pair spaced by $T_{SMP}$, including the dark current occurring between $V_{RST-i-N}$ and $V_{SIG}$ of equation (1). Alternatively, $V_{SIG}$ may be sampled at a different, corresponding time after a prior sampled reset signal (e.g. at time $\frac{1}{2}T_{SMP}$, or $2T_{SMP}$) etc. after $V_{RST-i-N}$).

Equation (1) calculates the difference between (i) the signal increase between $V_{RST-1}$ and $V_{RST-2}$ (i.e., $-DK_{T^{SMP}}$, the dark current over time $T_{SMP}$) and (ii) the signal increase between $V_{RST-i-N}$, and $V_{SIG}$, (i.e., $DK_{T^{SMP}}$+the pixel signal). Thus, the correlated sampling circuit 90 calculates the sum of ($-DK_{T^{SMP}}$) and ($DK_{T^{SMP}}$+the pixel signal) which reduces to the pixel signal.

As explained in detail below, FIG. 6 represents a specific example of the correlated sampling circuit 90 of FIG. 5 for sampling and holding the output of integrator circuit 40, and for generating a pixel output signal according to equation (1). Operation of the specific example of correlated sampling circuit 90 shown in the FIG. 6 circuit as used to compute equation (1) for N=3, will now be described with further reference to FIG. 7.

As shown in FIG. 7, a series of high pulse signals are applied at SW1, SW2, SW4, SW7, SW8. Application of high pulses at SW1, SW2 enables integrator circuit 40 to be reset in order to receive signals via column line 23. Integrator circuit 40 can be reset by applying a known differential voltage across the integration capacitor. An exemplary embodiment employing reset is shown in FIG. 6. In the embodiment of FIG. 6, the application of a high pulse to Reset switches SW1, SW2 closes these switches, and also causes a low pulse to be applied to switch /SW1 and opens this switch. This switch configuration results in the high reference voltage (via the output of integrator 42 and SW1) and low reference voltage (via SW2) to be applied to the plates of $C_{int}$.

As also shown in FIG. 7, a high pulse is applied at SW4, SW7, SW8. In the specific embodiment of FIG. 6, application of these pulses causes switches SW4, SW7 SW8 to close. In this switch configuration feedback capacitor $C_{fb}$ is reset and amplifier 95 is prepared to received signal values from integrator 40. Upon reset of amplifier 42, a first reset value $V_{RST-1}$ is sampled from column line 23 causing a corresponding change in the output of integrator circuit 40 for the column (e.g., Col_M of FIGS. 5, 6). Preferably, the sampling of $V_{RST-i-1}$ begins immediately upon pixel reset.

In the specific circuit example of FIG. 6, SW4, SW7 SW8 are closed and the output of integrator 40 is applied to the bottom plate of capacitor $C_{smpl}$ (via switch SW4). An offset adjusted reference voltage is applied to the top plate of $C_{smpl}$ via SW7 by applying the reference voltage to the positive terminal of amplifier 95 such that the amplifier 95 output is the offset adjusted reference voltage (i.e., the output includes the reference voltage plus amplifier offset), and is applied via switches SW8, SW10 (also in the closed position), and SW7 to the top plate of capacitor $C_{smpl}$. This switch configuration also resets feedback capacitor $C_{fb}$.

As further shown in the embodiment of FIG. 7, the previously applied pulses go low (i.e., corresponding switches open) and a next series of high pulses is applied at SW6, SW7. A $V_{RST-i-1}$ signal is then integrated onto amplifier 95 and $C_{fb}$. The sampling of the $V_{RST-i-1}$ signal represents the first point in the multi-point sampling.

As further shown in FIG. 7, the previously applied pulses (at SW6, SW7) go low and a next series of high pulses is applied at SW3, SW6 to sample and hold the reset voltage, $V_{RST-i-1}$ at the integrator circuit 40. In the specific circuit embodiment of FIG. 6, this switch configuration (i.e., SW3, SW6 closed) samples the output of integrator 42 (via SW3) onto the top plate of $C_{ampl}$ and samples a reference voltage (via SW6) onto the bottom plate of $C_{ampl}$. As further shown in FIG. 7, the previously applied pulses (at SW3, SW6) go low, and a next series of pulses is applied at SW6, SW7 to integrate $V_{RST-i-2}$. In the specific embodiment of FIG. 6, a $V_{RST-i-2}$ signal is sampled and held onto the correlated sampling circuit 90 (via SW7). The sampling of the $V_{RST-i-2}$ signal represents the second point in the multi-point sampling. In the specific circuit embodiment of FIG. 6, SW9 is also closed, and the previously integrated sample $V_{RST-i-1}$ (held on $C_{fb}$) is applied to the right-most plate of capacitor $C_{ac}$, and the sampled value $V_{RST-i-2}$ is applied to the left-most plate of capacitor $C_{ac}$ (via SW7), thereby creating a differential across $C_{ac}$ (e.g., $V_{RST-i-1}-V_{RST-i-2}$) which is applied to amplifier 95.

As next shown in FIG. 7, the previously applied pulses (i.e., SW6, SW7) go low (switches open) and a next series of high pulses is applied at SW3, SW6 to sample and hold the reset voltage, $V_{RST-i-N-3}$ at the integrator circuit 40. This again enables the output of integrator 42 to be sampled (via SW3) and a reference voltage (via SW6) on to the top and bottom plates of $C_{ampl}$. Next, as shown in FIG. 7, the previously applied pulses go low, and a series of pulses is applied at SW6, SW7 to integrate $V_{RST-i-3}$. A $V_{RST-i-N-3}$ signal is sampled and held onto the correlated sampling circuit 90 (via SW7). The sampling of $V_{RST-i-3}$ represents the third (and final reset signal) point in the multi-point sampling of the embodiment of FIG. 7. In the specific circuit embodiment of FIG. 6, SW9 is closed, and the previously calculated differential $V_{RST-i-1}-V_{RST-i-2}$ (held on $C_{fb}$) is applied to the right-most plate of capacitor $C_{ac}$, and the sampled value $V_{RST-i-3}$ is applied to the left-most plate of capacitor $C_{ac}$ (via SW7), thereby creating a differential across $C_{ac}$ (e.g., $[(V_{RST-i-1}-V_{RST-i-2})-V_{RST-i-3}]$ which is applied to amplifier 95.

Other values of N can be employed in the present invention. In the specific circuit embodiment of FIG. 6, the series of switch configurations for sampling and holding the reset voltage for a given sample on the integrator circuit 40 (with switches SW3, SW6 closed), and integrating the sampled reset voltage onto the correlated sampling circuit 90 (with SW6, SW7 closed), are repeated for each sample i until i=N.

For the N=3 example shown in FIG. 7, and with reference to FIG. 6, after the sampling of the i=N=3 reset voltage sample, transfer signal TX is applied which causes charges accumulated photodiode 16 to be placed on column line 23. Preferably, as shown in FIG. 7, TX is applied at the end of sampling $V_{RST-i-N}$ onto integrator 40, and before integration of the $V_{RST-i-N}$ signal onto amplifier 95 of correlated sampling circuit 90. As shown in FIG. 6, application of transfer signal TX drives transfer transistors 20 of a given row, and results in the transfer of charge stored on corresponding pixels 13. The pixel 13 charges for the designated row are read out onto respective column lines 23 (e.g., Col_M of FIG. 6).

As further shown in FIG. 7, after the pulse signals SW6, SW7 corresponding to the integration of $V_{RST-i-N}$ go low, a next series of high pulses (SW4, SW5) is applied to correlated sampling circuit 90 for the sampling of the pixel signal. In the specific circuit embodiment of FIG. 6, the pixel signal $V_{SIG}$ is output from integrator circuit via SW4 to the bottom plate of $C_{smpl}$, and a reference voltage applied (via SW5) to the top plate of $C_{smpl}$. Next, as shown in FIG. 7, the previously applied pulses (SW4, SW5) go low, and a series of pulses is applied at SW6, SW7 to integrate $V_{SIG}$ onto amplifier 95 and $C_{fb}$. The sampling of $V_{SIG}$ represents the final point in the multi-point sampling. In the specific circuit embodiment of FIG. 6, SW9 is closed, and the previously calculated differential $[(V_{RST-i-1}-V_{RST-i-2})-V_{RST-i-3}]$ (held on $C_{fb}$) is applied to the right-most plate of capacitor $C_{ac}$, and the sampled value corresponding to $V_{SIG}$ is applied to the left-most plate of capacitor $C_{ac}$ (via SW7). The switch configuration used to sample $V_{SIG}$ (SW4, SW5) reverses the polarity of the voltage stored on $C_{smpl}$ as compared to the switch configuration used to sample the reset voltages (i.e., the SW3, SW6 switch configuration), thus the sampled $V_{SIG}$ that is integrated onto correlated sampling circuit 90 is referred to as $V_{SIG}$. The resulting differential across $C_{ac}$ (e.g., $[(V_{RST-i-1}-V_{RST-i-2})-V_{RST-i-3}-(-V_{SIG})])$ is applied to amplifier 95 and calculates equation (1):

$$V_{RST-i-1}-V_{RST-i-2}-V_{RST-i-N}+V_{SIG}=(V_{RST-1}-V_{RST-2})+(V_{SIG}-V_{RSTN}) \quad (1)$$

$V_{SIG}$ includes the signal corresponding to the charge collected by pixels 13. The transfer signal drive time for TX (i.e., the length of the TX pulse) preferably both occurs immediately after the sample pulses SW3, SW4 for $V_{RST-i-N}$ go low, and is sufficiently less than time $T_{SMP}$, so that the charge stored on pixel 13 for a given row and column has been completely sampled (i.e., $V_{SIG}$ can be sampled) onto a corresponding column line prior to the integration of the $V_{SIG}$ signal.

As an alternative to calculating equation (1) in hardware, the output signals from amplifier 95 can be calculated using software (e.g., by digitizing the output signals corresponding to the sampled reset signals $V_{RST-i-1 \ldots N}$ and the pixel signal $V_{SIG}$ as needed to calculate equation (1)).

Using this multi-point sampling method, residual dark current can be removed by subtracting the increase in dark current occurring between reset and the pixel signal sample point $V_{SIG}$ according to equation (1) above. As shown in FIG. 7, $(V_{SIG}-V_{RST-i-N})$ is the difference of the signal sample $(V_{SIG})$ and a reset sample $(V_{RST-i})$ spaced by time $T_{smp}$, and where $(V_{RST-i-1}-V_{RST-i-2})$ is the difference between the first and second reset samples spaced by time $T_{smp}$.

Residual dark current represents noise not captured by traditional two-point sampling methods. Traditional two-point sampling methods sample once (sample point $V_{RST}$) before transfer transistor are pulled high for pixel transfer to the column line (for example, $V_{RST}$ can be sampled near the end of pixel reset, shortly before pixel signal transfer), and once after pixel charge transfer (represented by sample point $V_{SIG}$). This traditional two point sampling method only samples the reset signal once, and fails to capture the residual dark current that occurs after the first sample point $V_{RST}$. By including more than one reset sample point, the method of the present invention can be used to approximate the dark current occurring between $V_{RST}$ and $V_{SIG}$, and captures otherwise un-captured residual dark.

Because the dark current appearing at the integrator output is constant, the rate of increase in dark current over a given time period (e.g., $T_{SMP}$) can be measured by sampling the difference between the two reset samples $(V_{RST-i-1}-V_{RST-i-2})$. The increase in dark current can be determined prior to pixel signal transfer for a given sample time $T_{SMP}$, which can be used to determine dark current occurring after pixel signal transfer over a comparable sample point, preferably the same sample point $T_{smp}$. For example, as shown in FIG. 7, the same time period $T_{SMP}$ is used between the end of the first reset sample point and the end of the second reset sample point, as is used between the end of the last reset sample point, and the end of the pixel signal sample point. Thus the differential $(V_{RST-i-1}-V_{RST-i-2})$ not only represents the dark current $(-DK_{TSMP})$ occurring between the two reset sample points, but also represents the dark current occurring between $V_{RST-i-N}$ and the pixel signal sample point $V_{SIG}$. By adding $[V_{RST-i-1}-V_{RST-i-2}]$ (i.e. $-DK_{TSMP}$) to $[V_{SIG}-V_{RSTi-N}]$ (pixel signal+$DK_{TSMP}$), the dark current $(DK_{TSMP})$ is removed.

Figure 8A:
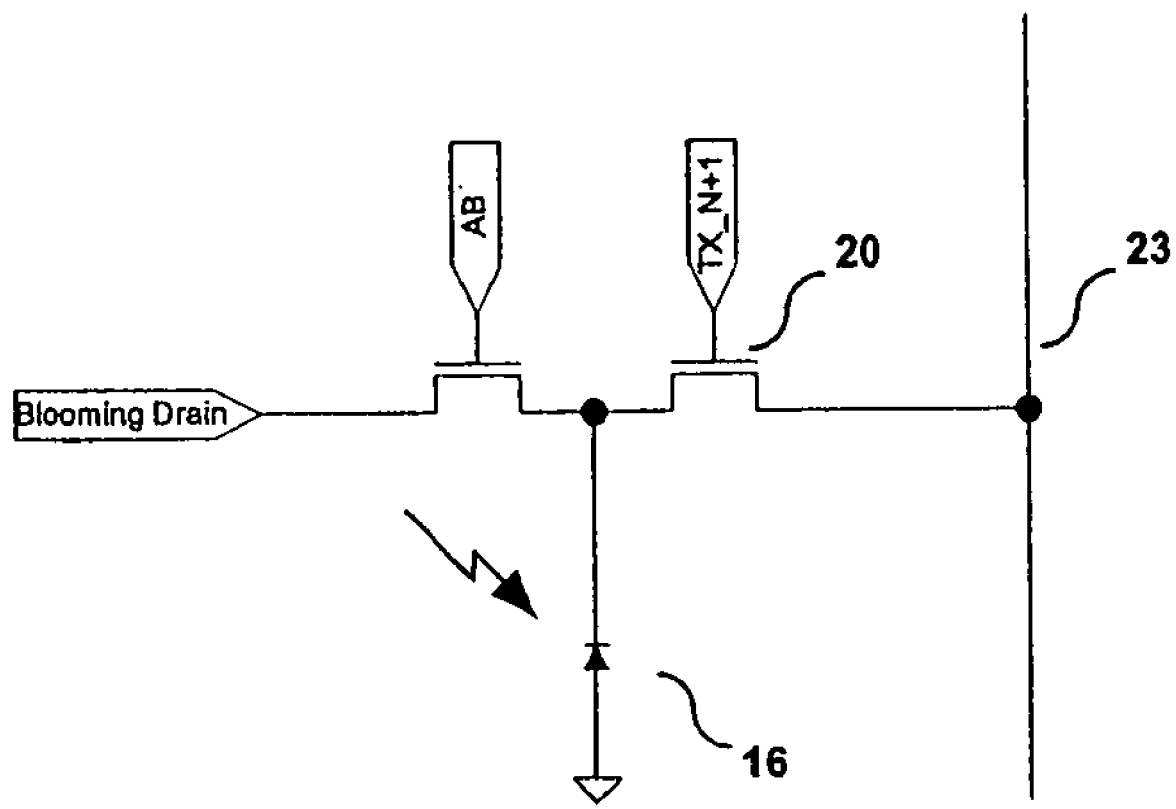
FIG. 8A is a schematic of a PPS pixel cell for an image sensor having an anti-blooming transistor.
Figure 8B:
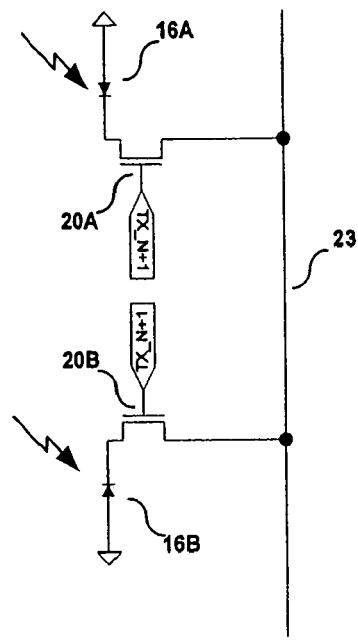
FIG. 8B is a schematic of a two-way shared PPS pixel cell configuration for an image sensor.
Figure 8C:
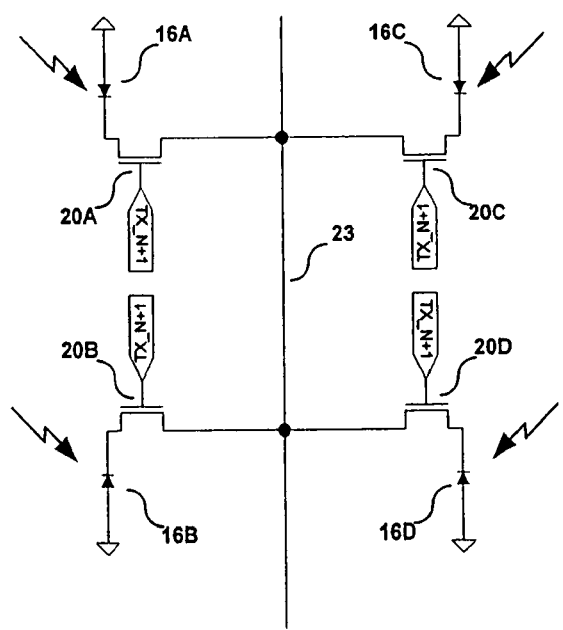
FIG. 8C is a schematic of a four-way shared PPS pixel cell configuration for an image sensor.

While PPS pixel cell 13 (previously described with reference to FIG. 2B) is shown in the FIG. 5 embodiment and the specific circuit embodiment of FIG. 6, one skilled in the art would recognize that various kinds of pixels can be employed in the invention, for example, the alternative PPS pixel embodiments shown in FIGS. 8A-C.

FIG. 8A implements a PPS pixel having an anti-blooming transistor AB which is biased at a slightly positive voltage to drain blooming charge from other rows away from column 23 during signal sampling. FIG. 8B is an embodiment of a two-way shared pixel configuration in which two photodiodes 16 discharge to column line 23 in response to a transfer signal applied at the same or substantially the same time (e.g., TX_N+1 is applied to both transistors 20A and 20B). FIG. 8C is an embodiment of four-way pixel configuration in which four photodiodes 16 discharge to column line 23 in response to a transfer signal applied at the same or substantially the same time (e.g., TX_N+1 is applied to each transistors 20A, 20B, 20C and 20D). The shared configurations of FIGS. 8B and 8C have the benefits of reduced output diffusion and increased fill factor over non-shared configurations. The anti-blooming configuration of FIG. 8A has the advantage of draining additional noise as compared to the PPS pixel embodiment of FIG. 2B. In the FIG. 8A embodiment, the reset signal is sampled multiple times, and the pixel charge $V_{SIG}$ corresponding to a given pixel is sampled, and signal noise (e.g., dark integration) further reduced in accordance with equation (1). In the FIGS. 8B, and 8C embodiments the reset signal is sampled multiple times (e.g., corresponding to samples $V_{RST-i-1-N}$), and $V_{SIG}$ (which comprises the pixel charge collected by each of the shared pixels plus signal noise (including dark integration transferred to the column line)) is transferred to column line 23 and sampled. As described above, the dark integration increase can be considered substantially constant and can be determined by two reset signal samples spaced by time period $T_{SMP}$. Using this dark current, and the difference between the shared pixel signal sample $V_{SIG}$ and a prior reset signal sample spaced by time $T_{SMP}$, dark current can be removed from the pixel signal according to equation (1). Alternatively, as previously described, $V_{SIG}$ may be sampled at a different, corresponding time after a prior sampled reset signal (e.g. at time $\frac{1}{2}T_{SMP}$, or $2T_{SMP}$, etc. after $V_{RST-i-N}$), and equation (1) modified accordingly.

Figure 9:
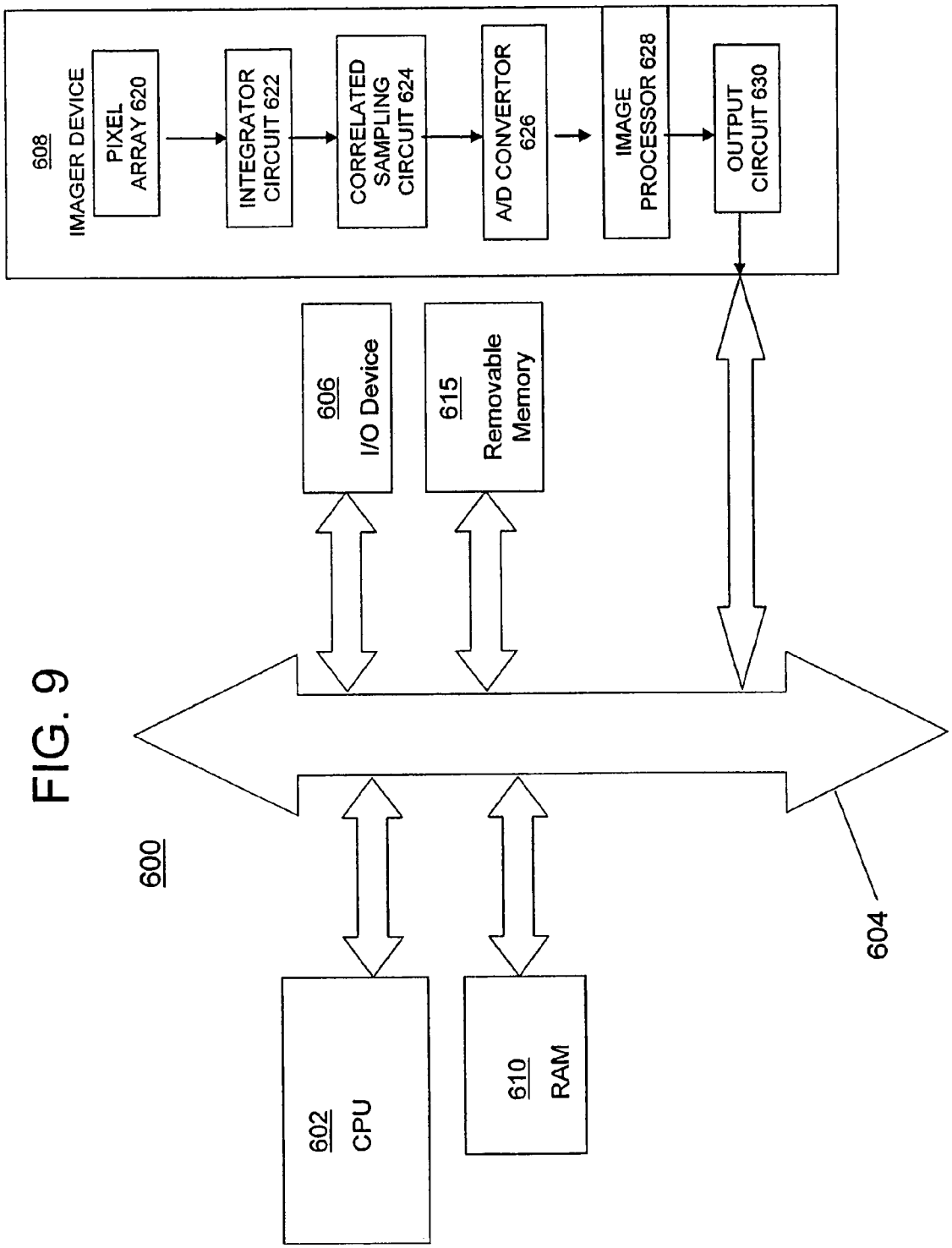
FIG. 9 is a block diagram of a processor system incorporating an image sensor comprising a PPS circuit in accordance with an exemplary embodiment of the invention.

FIG. 9 illustrates a block diagram of a processor system 600 incorporating an imaging device 608 comprising a PPS circuit with integrator and 3-point correlated sampling circuit constructed in accordance with exemplary embodiments of the invention. Imager device 608 can be employed, for example, to produce an A/D converter 626 output as shown in FIG. 1 (i.e., the digital output of FIG. 1) in accordance with an embodiment of the present invention (i.e., incorporating the integrator circuit 622, correlated sample circuit 624). Examples of processor-based systems include, without limitation, computer systems, camera systems, scanners, machine vision systems, vehicle navigation systems, video telephones, surveillance systems, auto focus systems, star tracker systems, motion detection systems, image stabilization systems, and other imaging systems.

Imaging device 608 is comprised of a pixel array 620 that outputs analog signals (corresponding to collected pixel charge) to an integrator circuit 622 that outputs an integrated analog signal to a correlated sampling circuit 624. Correlated sampling circuit 624 performs a three-point correlated sampling and outputs an analog signal corresponding to equation (1) above to an analog to digital converter 626. Digital converter 626 digitizes the analog signal, and outputs a corresponding digital signal to an image processor 628 which processes the digital signal and outputs it to output circuit 630.

The system 600 generally comprises a central processing unit (CPU) 602, such as a microprocessor, that communicates with an input/output (I/O) device 606 over a bus 604. An imager device 608 also communicates with the CPU 602 over the bus 604. The system 600 also includes random access memory (RAM) 610, and can include removable memory 615, such as flash memory, which also communicates with CPU 602 over the bus 604. Imaging device 608 may be combined with a processor, such as a CPU, digital signal processor, or microprocessor, with or without memory storage on a single integrated circuit or on a different chip than the processor.

The present invention further includes a fabrication method for fabricating embodiments of the invention as part of an imager device 608 and for connecting them comprising forming on an integrated circuit chip: pixel array 620 comprising pixel cells and readout circuitry; an integrator circuit 622; a correlated sampling circuit 624 for sampling and holding at least two pixel reset signals and a pixel charge signal and for removing residual dark current from the pixel charge signal; and connections for transmitting analog signals from pixel array 620 to integrator circuit 622, and from integrator circuit 622 to correlated sampling circuit 624. The method of fabricating correlated sampling circuit 624 may also include fabricating: analog to digital converter 626 for converting the output of correlated sampling circuit 624 to a digital signal; image processor 628; imager device output circuit 630; and connections for transmitting analog signals from correlated sampling circuit 624 to analog to digital conversion circuit 626, from analog to digital conversion circuit 626 to image processor 628 and then to imager device output circuit 630. The method of fabricating correlated sampling circuit 624 may also include fabricating: a switched capacitor and amplifier network for sampling and holding the at least two pixel reset signals and the pixel charge signal and for removing residual dark current from the pixel charge signal.

The processes and devices described above illustrate exemplary methods and devices of many that could be employed in the invention. The above description and drawings illustrate exemplary embodiments, which achieve the objects, features, and advantages of the present invention. However, it is not intended that the present invention be strictly limited to the above-described and illustrated embodiments. Any modification of the present invention that comes within the spirit and scope of the following claims should be considered part of the present invention.

What is claimed as new and desired to be protected by Letters Patent of the United States is:

1. An image sensor comprising:
    an array of passive pixel sensors;
    an integrator circuit for receiving charge collected by one or more passive pixel sensors of said array, for receiving a reset voltage, and for generating corresponding integrator circuit output signals; and
    a correlated sampling circuit for, after a first reset operation and before a second reset operation, respectively sampling and holding at least two reset signals generated by the first reset operation.

2. The image sensor of claim 1, wherein the integrator circuit comprises:
    an integrating amplifier having an output line coupled to the correlated sampling circuit;
    an integrating capacitor coupled on one end to a low voltage source, and coupled on the other end each to a high voltage source and, via a column line, to a selected pixel sensor, the integrating capacitor further being coupled in parallel to the integrating amplifier.

3. The image sensor of claim 2, wherein the integrating amplifier produces an error voltage, the integrator circuit further comprising an offset calibration circuit coupled to the integrating capacitor for applying an adjustment voltage for offsetting the error voltage.

4. The image sensor of claim 1,
    wherein said at least two sampled and held reset signals comprise a first reset signal $V_{RST-1}$ and a second reset signal $V_{RST-2}$, and
    said image sensor further comprises a first reset switch coupled to the column line and coupled to the integrating capacitor for applying a high voltage, and a second reset switch coupled to the integrating capacitor and to the integrating amplifier for applying a low voltage, said high and low voltage providing a reset voltage across said integrating capacitor, said reset voltage providing an output at said integrator circuit which is sampled at two spaced points in time to produce said first reset signal $V_{RST-1}$ and second reset signal $V_{RST-2}$.

5. The image sensor of claim 1, wherein the correlated sampling circuit samples and holds at least one of the at least two reset signals and pixel output signal $V_{SIG}$ corresponding to an output of a pixel sensor.

6. The image sensor of claim 5, wherein:
said at least two reset signals comprise a first reset signal $V_{RST-1}$ and a second reset signal $V_{RST-2}$, and
said correlated sampling circuit comprises a switched capacitor network having at least one sample and hold capacitor for receiving the first reset signal $V_{RST-1}$, second signal second reset signal $V_{RST-2}$, and pixel output signal $V_{SIG}$; and
the correlated sampling circuit receives signals corresponding to the voltages held on said at least one sample and hold capacitor to produce signals $(V_{RST-1}-V_{RST-2})+(V_{SIG}-V_{RST-2})$.

7. The image sensor of claim 1,
wherein said at least two reset signals comprise a first reset signal $V_{RST-1}$, a second reset signal $V_{RST-2}$, and a third reset signal $V_{RST-3}$, and
said image sensor further comprises a first reset switch coupled to the column line and coupled to the integrating capacitor for applying a high voltage, and a second reset switch coupled to the integrating capacitor and to the integrating amplifier for applying a low voltage, said high and low voltage providing a reset voltage across said integrating capacitor, said reset voltage providing an output at said integrator circuit which is sampled at three spaced points in time to produce said first reset signal $V_{RST-1}$, second reset signal $V_{RST-2}$, and a third reset signal $V_{RST-3}$.

8. The image sensor of claim 7, wherein said correlated sampling circuit:
comprises a switched capacitor network comprising at least one sample and hold capacitor for receiving the first reset signal $V_{RST-1}$, second reset signal $V_{RST-2}$, third reset signal $V_{RST-3}$, and a pixel output signal $V_{SIG}$ corresponding to an output of a pixel sensor; and
receives signals corresponding to the voltages held on said at least one sample and hold capacitor to produce signals $(V_{RST-1}-V_{RST-2})+(V_{SIG}-V_{RST-3})$.

9. The image sensor of claim 1, wherein said correlated sampling circuit samples and holds a pixel output signal $(V_{SIG})$ corresponding to an output of a pixel sensor, and wherein said correlated sampling circuit produces output signals corresponding to (i) the differential between one of the at least two sampled and held reset signals and the pixel output signal or (ii) the differential between two of the at least two sampled and held reset signals.

10. A method of operating an image sensor comprising:
performing a first resetting of one or more pixel sensors of the image sensor;
generating a reset signal on a column line;
storing at least two sampled reset signals corresponding to the reset signal at respective points in time before performing a second resetting of the one or more pixel sensors of the image sensor; and
generating a reset differential voltage signal corresponding to the differential between two of said at least two sampled reset signals.

11. The method of claim 10, further comprising:
generating a pixel voltage corresponding to an output of a pixel sensor on the column line; and
storing a pixel signal corresponding to the integrated pixel voltage; and
generating a pixel differential voltage signal corresponding to the differential between the pixel signal, and one of said at least two sampled reset signals 12. The method of claim 11, wherein said step of generating a reset differential voltage signal removes kTC noise.

13. The method of claim 11, wherein the storing of the two of said at least two sampled reset signals occurs at points spaced by time $T_{SMP}$; and wherein the storing of the pixel signal and the one of said at least two sampled reset signals occurs at points spaced by time $T_{SMP}$.

14. A method of operating an image sensor comprising:
performing a first resetting of one or more pixel sensors of the image sensor;
generating a reset signal on a column line;
storing a first sampled reset signal corresponding to the reset signal at a first point in time before performing a second resetting of the one or more pixel sensors of the image sensor;
storing a second sampled reset signal corresponding to the reset signal at a second point in time before performing a second resetting of the one or more pixel sensors of the image sensor; and
generating a reset differential signal corresponding to the differential between the first sampled reset signal and the second sampled reset signal.

15. The method of claim 14, wherein said reset differential signal corresponds to kTC noise.

16. The method of claim 14, further comprising:
photo-generating charge at pixel sensor on the column line;
generating a pixel signal corresponding to said photo-generated charge on the column line;
storing the pixel signal; and
generating a pixel differential signal corresponding to the differential between the second sampled reset signal and the pixel signal.

17. The method of claim 16, wherein said storing of the second sampled reset signal is at a point in time $T_{SMP}$ after said storing of the first sampled reset signal, and said storing of the pixel signal is at a point in time $T_{SMP}$ after said storing of the second reset signal.

18. A method of fabricating an imager comprising:
forming on an integrated circuit chip a pixel array comprising passive pixel cells and readout circuitry; and
forming on the integrated circuit chip an integrator circuit and a correlated sampling circuit for sampling and holding, after a first reset operation and before a second reset operation, at least two reset signals generated by the first reset operation and a pixel charge signal $V_{SIG}$ to produce an adjusted pixel signal.

19. The method of fabricating of claim 18, wherein said forming an integrator circuit comprises:
forming an integrating amplifier having an output line coupled to the correlated sampling circuit;
forming an integrating capacitor coupled on one end to a low voltage source and on the other end to each a high voltage source and, via a column line, to a selected pixel sensor of a passive pixel cell of the pixel array, said integrating capacitor further being coupled in parallel to the integrating amplifier.

20. The method of fabricating of claim 19, wherein the at least two reset signals comprise a first reset signal $V_{RST-1}$, second reset signal $V_{RST-2}$, and third reset signal $V_{RST-3}$, and forming a differential amplifier for producing signals $(V_{RST-1}-V_{RST-2})+(V_{SIG}-V_{RST-3})$.

21. A method of operating an image sensor comprising:
resetting a signal line which receives an output signal from a pixel sensor; and
sampling and holding signals from said reset signal line at spaced points in time to produce at least two sampled and held reset signals after the first resetting and before a second resetting of the signal line.

22. The method of claim 21, further comprising:
coupling a pixel output signal from the pixel sensor to said signal line;
sampling and holding said pixel output signal; and
producing a correlated output signal based on a combination of said at least two sampled and held reset signals and said sampled and held pixel output signal.

23. The method of claim 22, wherein the pixel sensor is a passive pixel sensor.

* * * * *

UNITED STATES PATENT AND TRADEMARK OFFICE
CERTIFICATE OF CORRECTION

PATENT NO. : 7,476,836 B2
APPLICATION NO. : 11/898433
DATED : January 13, 2009
INVENTOR(S) : Boemler Page 1 of 1

It is certified that error appears in the above-identified patent and that said Letters Patent is hereby corrected as shown below:

In column 15, lines 17-18, in Claim 6, after "$V_{RST-1}$," delete "second signal".

In column 16, line 8, in Claim 11, after "signal" insert -- . --.

Signed and Sealed this

Thirty-first Day of March, 2009

JOHN DOLL
*Acting Director of the United States Patent and Trademark Office*